E. L. KRAFT.
REAR AXLE STRUCTURE FOR MOTOR VEHICLES.
APPLICATION FILED APR. 29, 1920.
1,386,510.
Patented Aug. 2, 1921.
3 SHEETS—SHEET 1.
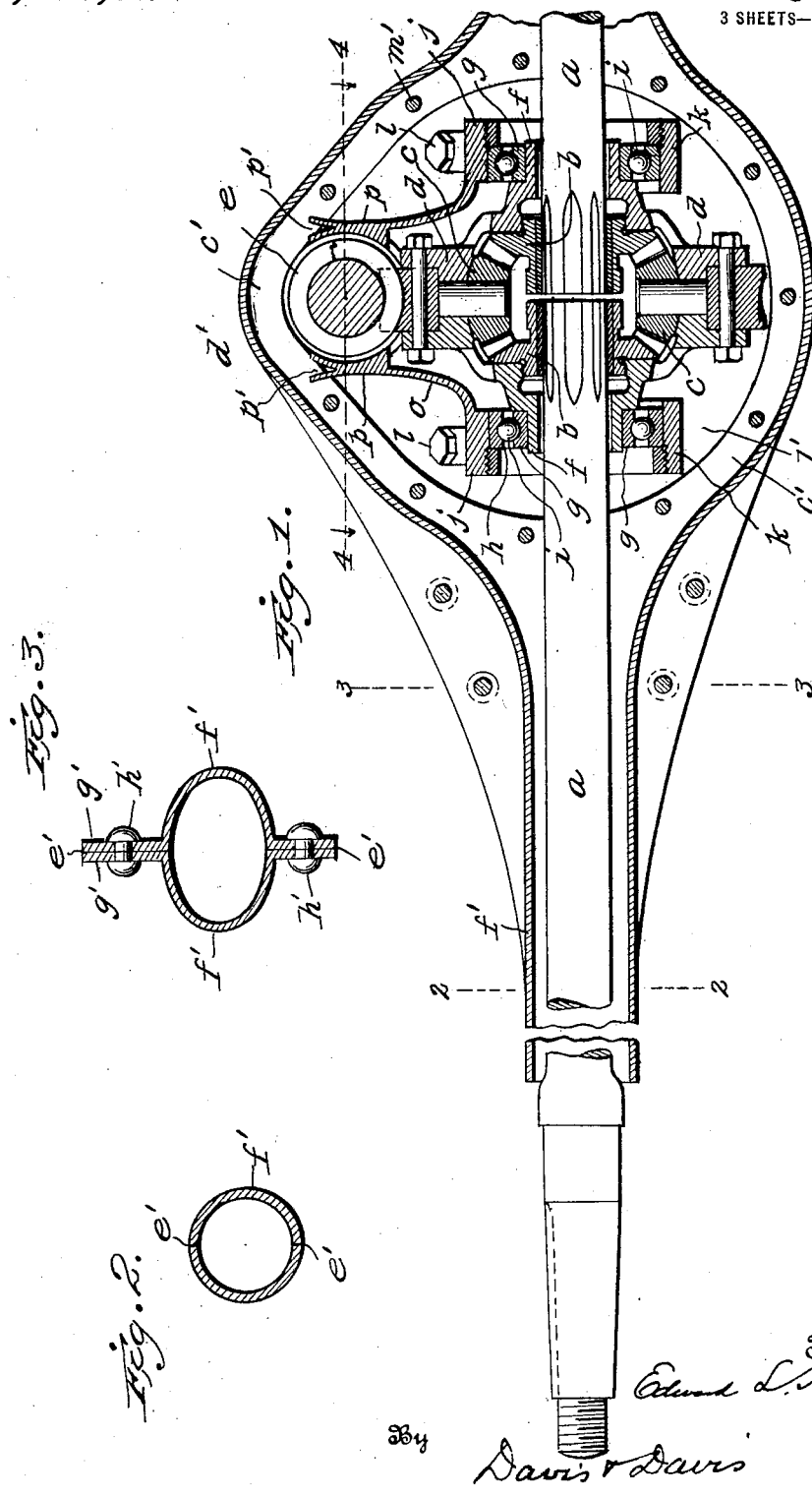
Inventor
Edward L. Kraft
By Davis & Davis
Attorneys E. L. KRAFT.
REAR AXLE STRUCTURE FOR MOTOR VEHICLES.
APPLICATION FILED APR. 29, 1920.
1,386,510.
Patented Aug. 2, 1921.
3 SHEETS—SHEET 2.
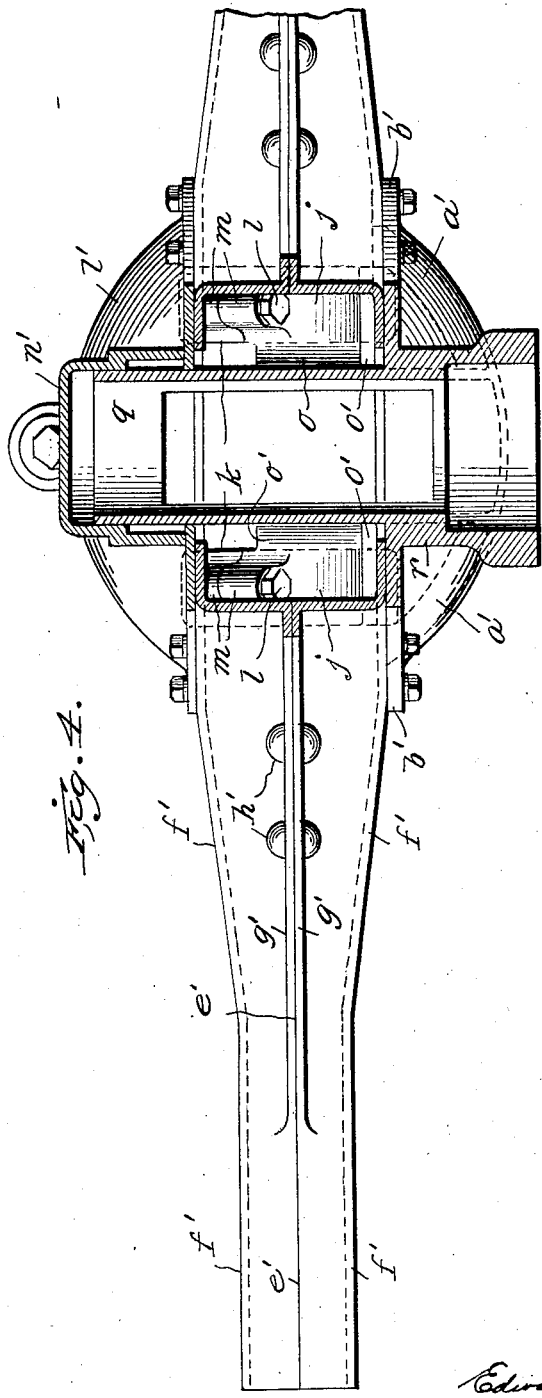

E. L. KRAFT.
REAR AXLE STRUCTURE FOR MOTOR VEHICLES.
APPLICATION FILED APR. 29, 1920.
1,386,510.
Patented Aug. 2, 1921.
3 SHEETS—SHEET 3.
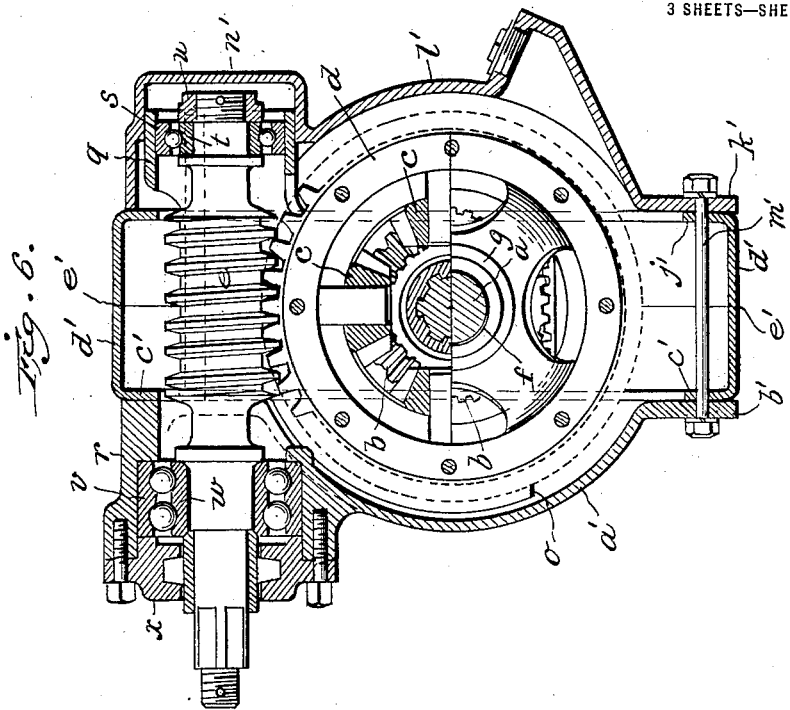
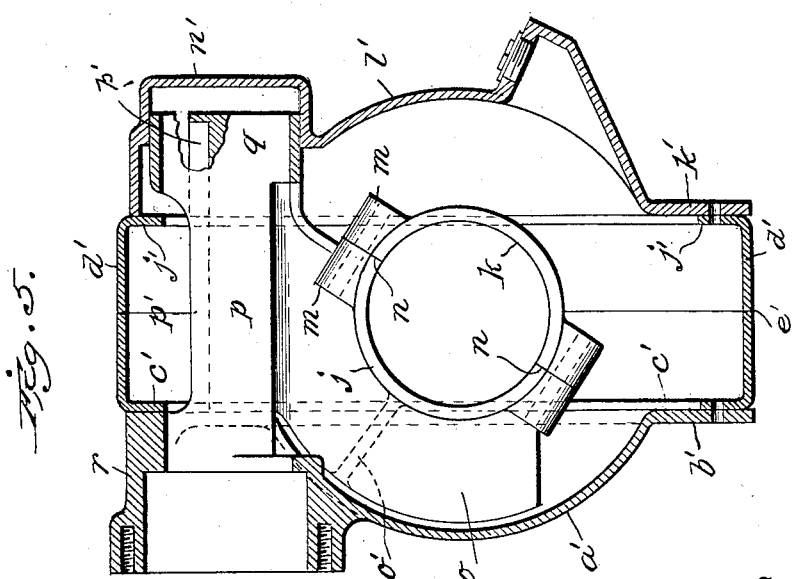
Inventor
Edmund L. Kraft
By Davis & Davis
Attorneys

UNITED STATES PATENT OFFICE.

EDWARD L. KRAFT, OF YORK, PENNSYLVANIA, ASSIGNOR OF ONE-HALF TO ALLEN R. COSGROVE, OF YORK, PENNSYLVANIA.

REAR-AXLE STRUCTURE FOR MOTOR-VEHICLES.

1,386,510.

Specification of Letters Patent.

Patented Aug. 2, 1921.

Application filed April 29, 1920. Serial No. 377,603.

*To all whom it may concern:*

Be it known that I, EDWARD L. KRAFT, a citizen of the United States of America, and a resident of York, county of York, and State of Pennsylvania, have invented certain new and useful Improvements in Rear-Axle Structures for Motor-Vehicles, of which the following is a full and clear specification.

This invention has relation to that class of rear-axle driving mechanism which embodies a worm driven by the engine, a divided axle, and a differential planetary gearing arrangement; and one object of the present invention is to simplify and improve the anti-friction bearing supports for the worm-shaft as well as of the worm-gear, the arrangement being such that these bearing supports may be cast integral and will be accurately alined as well as spaced with reference to each other, as more fully hereinafter set forth. A further object is to so arrange the bearings of the worm as well as the worm-gear with respect to a removable gear-case cover that the gears may be not only readily inspected but also may be readily removed from the casing for cleaning and repairing, as more fully hereinafter set forth. Further objects of my invention will appear in the course of this specification.

In the drawings—

Figure 1 is a vertical longitudinal section taken through the axle-housing and the gearing;

Figs. 2 and 3 are transverse sections on the lines 2 and 3 respectively of Fig. 1;

Fig. 4 is a horizontal section on the line 4—4 of Fig. 1;

Fig. 5 is a vertical sectional view in detail of the gear-casing and worm-housing;

Fig. 6. is a transverse sectional view through the gear-casing, the differential planetary gears being shown partly in vertical section and partly in side elevation.

The two axle sections *a* have each affixed to its inner end the usual bevel-gear *b*, which gears mesh with the bevel planetary gears *c* carried by the worm-gear *d* which meshes with the usual worm *e*. The gears *b* are fixedly mounted as shown within a central recess in the worm-gear which forms a housing for the differential gears, and each of the hubs *f* of the worm-gear is supported on a roller-bearing consisting of a ring *g* affixed to the exterior of said hub, an outer ring *h* and the intermediate balls *i*. The outer race-rings *h* are each fitted into a ring-support consisting of two semi-circular parts *j* and *k* fastened together around the ring *h* by means of bolts *l* extending through lugs *m* formed on the respective semi-rings *j* and *k*, the line of division *n* between the semi-rings *j* and *k* being arranged to incline upwardly and rearwardly, so that the semi-rings *j* are at the front of the bearing while the companion semi-rings *k* are at the rear of the bearing and are therefore removable downwardly and rearwardly.

The bearing-rings *j*—*k* are each supported centrally within the gear-casing by means of a web *o* formed integral with the member *j* and depending from a side-plate *p* extending fore and aft of the gear-casing and arranged at one side of the worm *e*. The rear ends of the side-plates or housing-members *p* are connected together by an integral ring *q*, and the forward ends of the side-plates *p* are similarly connected by a ring *r*, these two rings *q* and *r* serving as supports for the anti-friction bearings arranged at opposite ends of the worm. At the rear end of the worm, the bearing consists of a non-rotatable race-ring *s* slidably affixed in the bearing-support *q* and a companion race-ring *t* affixed non-rotatively on the axle of the worm by means of a nut *u*. The forward end of the worm-shaft is mounted on an outer race-ring *v* removably mounted in the ring *r* and an inner race-ring *w* affixed to the worm-shaft, both the rings *v* and *w* being removable out through the forward end of the ring or barrel *r*. The forward bearing *v*—*w* is held in place by a cap *x* removably fastened to the end of the barrel *r* by suitable bolts and arranged to bear against the outer end of the non-rotatable ring *v*. With this arrangement of the bearings for the worm, it will be seen that the worm may be withdrawn forwardly by removing the nut *u* and also the cap *x* and rotating the worm while drawing it forwardly to disengage it from the worm-gear *d*, thereby permitting the rear rings *s* and *t* to be withdrawn rearwardly out of the bearing-ring *q*, while the forward bearing-rings *v*—*w* may be withdrawn forwardly out through barrel *r*. This disconnection of the worm from the remainder of the gearing may be accomplished, as is obvious, without disturbing the worm-gear or differential gearing.

The main part *a'* of the gear-casing is formed integral with the barrels $q$ and $r$, and to the flange $b'$ formed on this member $a'$ of the casing is bolted the inwardly-turned flanges $c'$ of the axle-housing members $d'$. This axle-housing consists of two channel-like members $d'$, one of which is bent upwardly over the gearing and the other of which curves downwardly under the gearing, thereby forming respectively the top and bottom walls of the gearing-casing. Each of the channel members $d'$ is formed of a pair of flanged plates welded together on a line $e'$, and where these channel-irons are extended out they form the tubular housing $f'$ for the axle sections provided with vertical flanges $g'$ which are welded together to form ribs running longitudinally, centrally along the axle tubes $f'$, these flanges being further secured together by rivets $h'$. In this way, a very light, stiff, truss-like axle-housing is provided, which housing forms a part of the gear-casing where it is arched around the gearing.

The rear edges of the channel members $d'$ are provided with flanges $j'$ which are similar to flanges $c'$, and against these flanges is abutted the flanged edge $k'$ of a cover-plate $l'$, this cover-plate being removably secured in place by means of bolts $m'$ which extend not only through the flanges $k'$ and $j'$ but also through the front flanges $b'$ and $c'$, to thereby rigidly but removably attach this cover-plate $l'$ to the main casing. Formed integral with the cover $l'$ is a cylindrical pocket $n'$ which embraces and supports as well as closes the rear end of the barrel $q$, the interior of this pocket $n'$ fitting closely the cylindrical form of the barrel, so as to brace and support the barrel, thereby insuring ample support for the rear bearing of the worm. The rear side of the axle-housing being open, it will be observed that when the cover $l'$ is removed the gearing may be readily inspected; and should it be desired to remove the gears this may be done by removing the sections $k$ of the hub-bearing supports, it being of course understood that before the gears can be taken out of the casing the axle-sections $a$ must be pulled out axially in the usual manner from engagement with the gears $b$. It will be observed that the line of separation between the semi-rings $j$ and $k$ is arranged to facilitate this withdrawal of the worm-gear and the other gears connected therewith. I have thus provided a simple way of taking out all the gears from the axle-housing, including the worm-gear, without materially dismantling the structure.

It will be observed that the front edges of the depending webs $o$ are cast integral with the main casing member $a'$ in order to brace them properly, and for further bracing them they are connected to said main casing member by webs $o'$. It is desirable also to form oil-troughs $p'$ along the top edges of the side-plates $p$ and extending along the outer surfaces of the rear bearing-support $q$, to thereby insure an ample supply of oil to the rear bearing of the worm.

It will be observed that the bolts $m'$ not only fasten the rear cap $l'$ to the axle-housing, but also the front cap or casing $a'$ and that by thus detachably and independently fastening these casing-members $l'$ and $a'$ to the axle-housing I am enabled to entirely assemble the gearing in the divided ring-supports $j$—$k$ before attaching the mechanism to the axle-housing, thereby contributing materially to assembling the completed structure.

The nature and scope of the invention having been thus indicated and its preferred embodiment having been specifically described, what is claimed as new is:

1. A rear-axle drive embodying a worm, a worm-gear and planetary gearing constituting the differential, a casing for said gearing connected to the axle housing and embodying a front wall carrying bearings for said worm-gear and also supports for the rear as well as the front bearings of the worm, and a rear cover-plate removable from the casing separately from said bearings, the opening covered by the rear cover-plate being sufficiently large to permit the removal of the worm-gear and its connected planetary gears while the worm and its bearing-supports are in their operative position.

2. A rear-axle drive embodying a worm, a worm-gear and planetary gearing constituting the differential, a casing for said gearing connected to the axle housing and embodying a front wall carrying bearings for said worm-gear and also supports for the rear as well as the front bearings of the worm, and a rear cover-plate removable from the casing separately from said bearings, said rear cover-plate being provided with a support for said rear bearing-support of the worm, the opening covered by the rear cover-plate being sufficiently large to permit the removal of the worm-gear and its connected panetary gears while the worm and its bearing-supports are in their operative position.

3. A rear-axle drive embodying a worm and a worm-gear and differential gears, a casing for the worm-gear and differential gears, said casing having a front cover-plate formed with front and rear worm bearing-supports and a rear cover-plate covering an opening large enough to permit the removal of the worm-gear and its connected planetary gears while the worm and its bearing-supports are in their operative position.

4. In a rear-axle drive embodying a worm and a worm-gear and differential gears, a casing embodying a main member forming a front cover-plate and integral supports for the bearings of the worm as well as depending integral supports for the hubs of the worm-gear, removable cap-plates for these hubs, and a rear cover-plate for the casing, this cover-plate serving to cover the rear open side of the casing, the opening in said rear side of the casing being large enough to permit the worm-gear to be removed out therethrough while the worm and its bearing-supports are in their operative position.

5. In a rear-axle drive embodying a worm and a worm-gear and differential gears, a casing embodying a main member forming a front cover-plate and integral supports for the bearings of the worm as well as depending integral supports for the hubs of the worm-gear, removable cap-plates for these hubs, the line of separation between the worm-gear hub-supports and their removable cap-plates being inclined to facilitate the removal of the worm-gear, and a rear cover-plate for the casing, this cover-plate serving to cover the rear open side of the casing, the opening in said rear side of the casing being large enough to permit the worm-gear to be removed out therethrough while the worm and its bearing-supports are in their operative position.

6. A rear-axle drive embodying an axle housing having an opening in which the differential gears are mounted, a front cover-plate covering said opening and carrying a front barrel as well as a rear barrel, the latter being supported by a supporting member extending through said opening in the axle housing, said supporting member lying above the differential gears, a worm whose bearings are mounted in the aforesaid barrels, and a rear removable cover-plate.

7. A rear-axle drive embodying an axle housing having an opening in which the differential gears are mounted, a front cover-plate covering said opening and carrying a front barrel as well as a rear barrel, the latter being supported by a supporting member extending through said opening in the axle housing, said supporting member lying above the differential gears, a worm whose bearings are mounted in the aforesaid barrels, and a rear removable cover-plate having an integral pocket formed at its upper end adapted to embrace and support said rear barrel.

8. A rear-axle drive embodying an axle housing having an opening for the reception of the differential gears, a front cover-plate for said opening affixed to the aforesaid axle housing and carrying the worm bearing support to position the worm at the top of the differential, and a removable rear cover-plate affixed to the axle housing covering an opening large enough to permit the removal of the worm-gear and planetary gears of the differential while the worm and its bearing support are in operative position.

9. A rear-axle drive embodying an axle housing having a central enlargement partially forming a casing for the differential and being open at its front and rear sides, an axle extending through said housing and composed of two independent sections each movable endwise outwardly to disconnect them from the differential, a cover-plate for the front side of said opening carrying a front as well as a rear bearing support for the worm and also a bearing support for the worm-gear hubs, this latter bearing having caps removable backwardly, and a rear cover-plate removable separately from said bearing supports and covering an opening in the axle housing large enough to permit the removal of the worm-gear and its planetary gears and pinions while the worm and its bearing supports are in operative position.

In testimony whereof I hereunto affix my signature.

EDWARD L. KRAFT.